Figure 1:
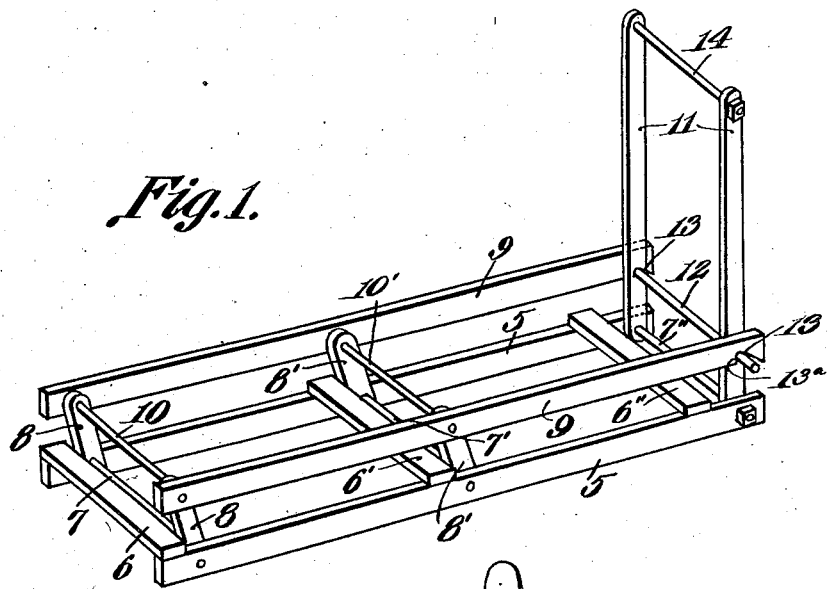

W. C. BOULDIN.
AUTOMOBILE JACK.
APPLICATION FILED AUG. 29, 1912.

1,074,690.

Patented Oct. 7, 1913.

Witnesses

W. C. Bouldin,
Inventor by C. A. Snow & Co.
Attorneys

UNITED STATES PATENT OFFICE.

W. CLAUGHTON BOULDIN, OF OAKLAND, TEXAS.

AUTOMOBILE-JACK.

1,074,690.

Specification of Letters Patent. Patented Oct. 7, 1913.

Application filed August 29, 1912. Serial No. 717,811.

*To all whom it may concern:*

Be it known that I, W. CLAUGHTON BOULDIN, a citizen of the United States, residing at Oakland, in the county of Colorado and State of Texas, have invented a new and useful Automobile-Jack, of which the following is a specification.

The present invention relates to an automobile jack, and aims to provide a device of this character adapted to lie below an automobile and raise the same by a single operation.

It is conceded and advised by tire manufacturers, that tires will last much longer, if, when at rest, or in the garage, the weight of the car or automobile is off of the tires, so as to relieve the tires of strain when the machine is at rest. At present it is common practice to jack one wheel at a time and to place a support under the corresponding ends of the axles as the wheels are jacked up. This method which is in vogue is most tedious and burdensome and therefore objectionable.

It is also the object of the present invention to provide such a jack which shall be simple, substantial, durable and inexpensive in construction, as well as convenient, serviceable and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings wherein corresponding parts have been designated by like reference characters, and wherein—

Figure 2:
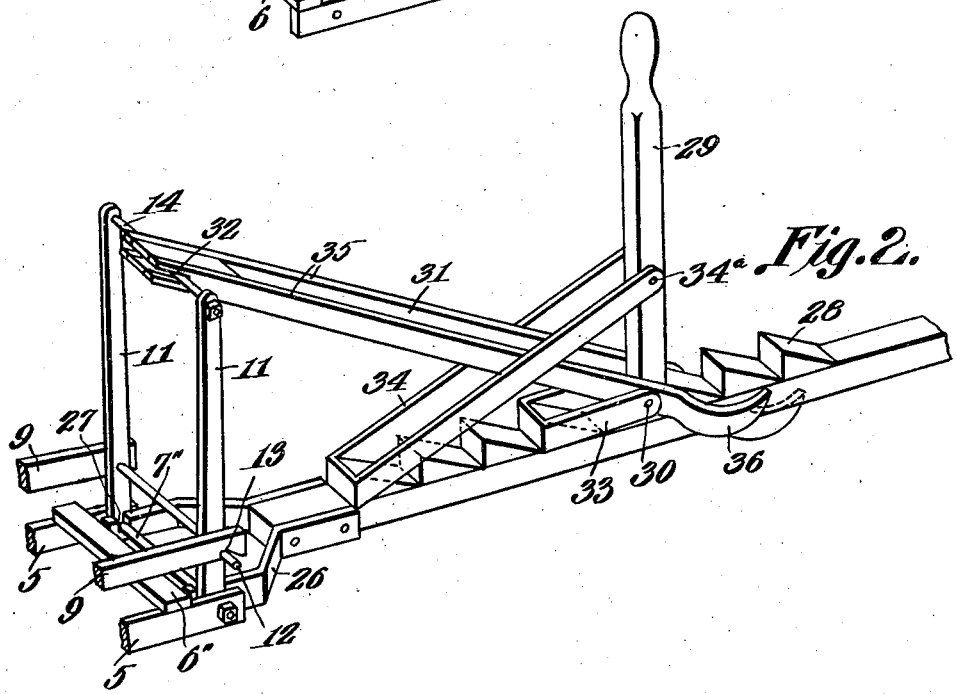

Figure 1 is a perspective view of the jack. Fig. 2 is a perspective showing an auxiliary mechanism for actuating the levers whereby the superposed frame is elevated.

Referring specifically to the drawings, the jack embodies a base or bed frame including a pair of longitudinal bars 5, which are set on edge, and which have their upper edges connected at one end by a cross piece 6, at an intermediate portion by a cross piece 6' and at the other end by a cross piece 6''. The bars 5 are also connected by the rungs 7, 7' and 7'' complementing and arranged adjacent the respective cross pieces 6, 6' and 6''. To the respective rungs 7 and 7' are pivoted the pairs of links 8 and 8', the said links being arranged adjacent the inner faces of the corresponding bars 5. It is to be understood that any number of lines may be used, and that the links may connect the base and the frame at any desired points. The jack also embodies a superimposed frame comprising a pair of longitudinal bars 9 complementing the bars 5 of the base and which are connected at one end by a rung 10 and at an intermediate portion by a rung 10', which rungs 10 and 10' complement the rungs 7 and 7' of the base. The respective pairs of links 8 and 8' are pivoted to the rungs 10 and 10' adjacent the inner faces of the corresponding bars 9.

The cross pieces 6 and 6' are so arranged that the respective pairs of links 8 and 8' will strike them when swung upwardly and slightly beyond a vertical position, so that it will appear that when the superimposed frame is swung upwardly to a predetermined position, the links will strike the corresponding cross pieces and limit the movement of the superimposed frame and prevent the same from retrograde movement.

A pair of levers 11 are pivoted or fulcrumed to the rung 7'' adjacent the inner faces of the corresponding bars 5, and the said levers are connected at an intermediate point by a rung 12, the ends of which project beyond the levers 11. The protruding ends of the rung 12 are adapted to swing into notches 13 cut in the lower edges of the bars 9 at their corresponding ends, the said notches 13 providing shoulders 13ª lying in the path of the rung 12, or the shoulders 13ª and rung 12 lying in the paths of each other. The ends of the levers 11 are connected by a rung 14, so that the levers are rigidly connected and may be simultaneously swung.

The various aforesaid parts may be constructed of any suitable material, such as wood, channel or angle iron, and the like, and are constructed of sizes to suit the circumstances. It is understood that the details are left to the mechanic and that the minor details may be altered or deviated in order to conform to the dictates of convenience or efficiency.

In use, the jack is adapted to rest on the floor or base or the like and is normally in prostrate position, that is, the superimposed frame is swung downwardly against the cross pieces 6' and 6" and the levers 11 are in a recumbent position against the floor or base. The automobile or car may be then run over the jack, or the jack may be slid under the automobile, so that the front and rear axles are positioned above the bars 9. The automobile may then be raised or jacked up by swinging the levers 11 upwardly, in which event, the protruding ends of the rungs 12 will strike the shoulders 13ª of the bars 9 and raise the said bars. As soon as the links 8 and 8' are swung slightly beyond a vertical position, they will strike the cross pieces 6 and 6', thereby locking the superimposed frame against retrograde movement. The bars 9 in being raised will engage the axles of the automobile and will raise the body, so that the tires free the floor or base, and the tires are in this manner relieved of the weight of the car body and are under no strain other than the pressure of air within same. The disintegration or deterioration of the tires is thus avoided while the car is at rest, and the objects aimed at are thus carried out.

When the automobile is to be lowered onto the floor or base, the levers 11 are swung toward the floor so that the rung 12 disengages the notches 13, it then being an easy matter to push the automobile in a direction so that the links swing away from the corresponding cross pieces and permit the automobile to run onto the floor in an easy and convenient manner.

This jack is adapted for use in garages and the like, and is susceptible of being employed for divers purposes, such as will be apparent.

When a heavy car is to be jacked up, the structure shown in Fig. 1 may not be capable of manual manipulation to accomplish the desired result. Under such circumstances, an auxiliary structure shown in Fig. 2, may be employed, the auxiliary structure constituting, to all intents and purposes, a part of the device which is shown in Fig. 1.

Referring to Fig. 2 there is shown a ratchet bar 28 having at one end, diverging arms 26, provided with notches 27, adapted to engage with the rung 7', the bar 28 thus constituting a part of the base or bed frame. The invention further includes a lever 29, hereinafter referred to as the secondary lever, the lever 11—11—14 constituting the primary lever. The secondary lever 29 is pivotally connected as indicated at 30, between the side strips 25 of an inclined thrust member 31, and the strips 35 are provided with notches 32 at the upper or front ends adapted to receive the rung 14, thereby to connect the thrust member 31 pivotally with the primary lever 11—11—14. The rear or lower ends of the side strips 35 straddle the ratchet bar and are prolonged, and are curved upon their lower edges, to form floor engaging feet 36. The pivot element 30 which connects the thrust member 31 with the secondary lever 29 serves also as a support for a relatively short, loop-shaped pawl 33 which is adapted to engage the ratchet bar 28. Another, longer, loop-shaped pawl 34 is pivoted to the lever 29 as indicated at 34ª and straddles the thrust member.

When the apparatus shown in Fig. 2 is employed for elevating a heavy car, the secondary lever 29 is swung to and fro, the pawls 33 and 34 engaging alternately with the ratchet bar 28 and imparting step by step movement to the thrust member 31, the thrust member engaging the rung 14 and serving to swing the primary lever to the elevated position shown in Fig. 2, the frame rising away from the base, and serving to jack up the car. During the foregoing operation, the feet 36 which lie along opposite sides of the bar 25, will ride along the floor or other support. After the primary lever has been raised, the thrust member may be detached therefrom and together with the secondary lever and the pawls may be removed so that when the automobile is to be lowered, there will be no obstruction. Also, when the device is not in use, the ratchet bar may be detached from the base and the whole may be compactly stored.

What is claimed as new is:

1. In a device of the character described, a base, a frame, links connecting the base and frame, a lever pivoted to the base for raising the frame, a ratchet bar connected to the base, a thrust member connected to the lever, an auxiliary lever pivoted to the thrust bar and a ratchet bar engaging pawl pivoted to the lever.

2. In a device of the character described, a base, a frame, links connecting the base and frame, a lever pivoted to the base for raising the frame, a ratchet bar connected to the base, a thrust member connected to the lever at one end with its other end adapted to ride on a surface, an auxiliary lever pivoted to the thrust member, and ratchet bar engaging pawls pivoted to the lever and thrust member.

3. In a device of the character described, a base, a frame, links connecting the base and frame, a lever pivoted to the base for raising the frame, a ratchet bar connected to the base, a thrust member embodying side strips engaged to the lever at one end with the other end straddling the ratchet bar to ride on the floor, an auxiliary lever pivoted between the strips, and ratchet bar engaging pawls pivoted to the auxiliary lever and thrust member.

4. In a device of the character described, a base, a frame, links connecting the base and frame, a lever pivoted to the said base for raising the same, a ratchet bar connected to the base, a thrust member embodying side strips engaged to the said lever with their rear ends straddling the ratchet bar to ride on the floor, an auxiliary lever pivoted between the strips, a looped pawl pivoted to the auxiliary lever and straddling the thrust member to engage the ratchet bar, and a looped pawl pivoted to the thrust member to engage the ratchet bar.

5. In a device of the character described, a base embodying an end rung, a frame, links connecting the base and frame, a lever pivoted to the said rung for raising the same and embodying a rung at its free end, a ratchet bar connected to the said rung of the base, a thrust member embodying side strips having notches at one end to engage the said rung of the lever, the other ends of the strips straddling the ratchet bar and formed into feet to ride on the floor, an auxiliary lever pivoted between the strips, a looped pawl pivoted to the auxiliary lever and straddling the thrust member to engage the ratchet bar, and a looped pawl pivoted to the strips to engage the ratchet bar.

In testimony that I claim the foregoing as my own, I have hereto affixed my signature in the presence of two witnesses.

W. CLAUGHTON BOULDIN.

Witnesses:
R. J. WILLIAMS,
H. BRASHER.